Figure 1:
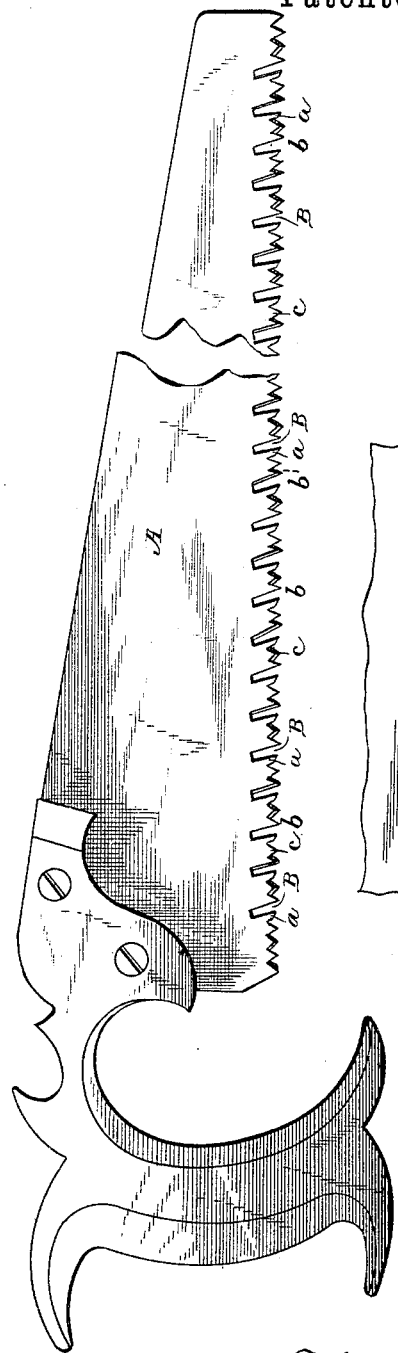

(No Model.)

F. STEPHENS.
SAW.

No. 394,222. Patented Dec. 11, 1888.

Witnesses.
Albert Speiden.
Herbert L. Davis.

Inventor,
Franklin Stephens.
By his Attorney
Franklin A. Hough.

N. PETERS, Photo-Lithographer, Washington, D. C.

UNITED STATES PATENT OFFICE.

FRANKLIN STEPHENS, OF VINELAND, NEW JERSEY.

SAW.

SPECIFICATION forming part of Letters Patent No. 394,222, dated December 11, 1888.

Application filed July 3, 1888. Serial No. 278,933. (No model.)

*To all whom it may concern:*

Be it known that I, FRANKLIN STEPHENS, a citizen of the United States, residing at Vineland, in the county of Cumberland and State of New Jersey, have invented certain new and useful Improvements in Saws; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in saws, and has for its object to combine in one implement a crosscut and rip saw, and to otherwise improve upon previous construction of saws, whereby they may be made to accomplish more work in less time and with the least exertion of power.

To these ends, and to such others as the invention may pertain, the same consists in the peculiarities of construction, all as hereinafter described, shown in the drawings, and then particularly pointed out in the appended claim.

Figure 2:
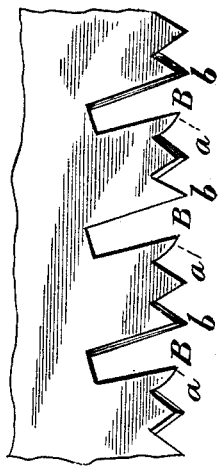
Figure 3:
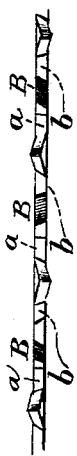

The invention is clearly illustrated in the accompanying drawings, which, with the letters of reference marked thereon, form a part of this specification, and in which Figure 1 represents a side view of a section of a saw constructed in accordance with my improvements. Fig. 2 is an enlarged detail, and Fig. 3 an edge view, of a portion of the blade.

In the said drawings the letter A designates the plate of the saw, which plate or blade is provided with teeth which are arranged in sets of three.

I am aware that it is not new, broadly, to arrange the teeth of a saw in sets of three, and do not claim such as part of my invention.

My teeth are arranged in a peculiar manner, as follows: The tooth $a$ of each set of three is made considerably smaller or shorter than the other two teeth of the set, and is inclined from a line drawn transversely through the blade, as shown, each tooth $a$ being separated from the tooth $b$ of the adjacent set by a throat, B, whose side walls are inclined, as shown. It will then be seen that both sides of that portion of the blade in which the set of three teeth is formed incline in the same direction. The center tooth, $c$, of each set is set, and both the teeth $b$ and $c$ are cutting-teeth, while the teeth $a$ are clearing-teeth. In setting the teeth it will be observed that the center tooth of each alternate set is set in the opposite direction. The bottom wall of the throat is inclined from a horizontal line through the blade, so that the sawdust will the more readily escape therefrom.

A saw constructed as above described will be found to run easy and to cut faster and smoother than saws of previous construction.

What I claim as new is—

As an improved article of manufacture, the herein-described saw provided with teeth arranged in sets of three, the first tooth of each set being shorter than the others and inclined from a perpendicular line through the blade, with its under face rounded, as shown, and separated from the next set by a throat or gully the side walls of which incline in the same direction and the bottom wall of which is inclined from a horizontal line through the blade and at a right angle to the side walls, and the center tooth of each alternate set being set in opposite direction, substantially as shown and specified.

In testimony whereof I affix my signature in presence of two witnesses.

FRANKLIN STEPHENS.

Witnesses
C. P. LORD,
A. S. VERDER.